Jan. 29, 1952         F. R. MILSOM         2,583,587
ELECTRIC INTEGRATING CIRCUIT
Filed Aug. 12, 1948
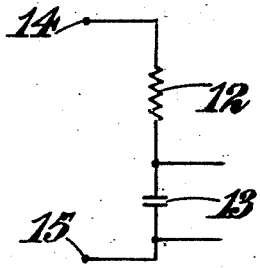
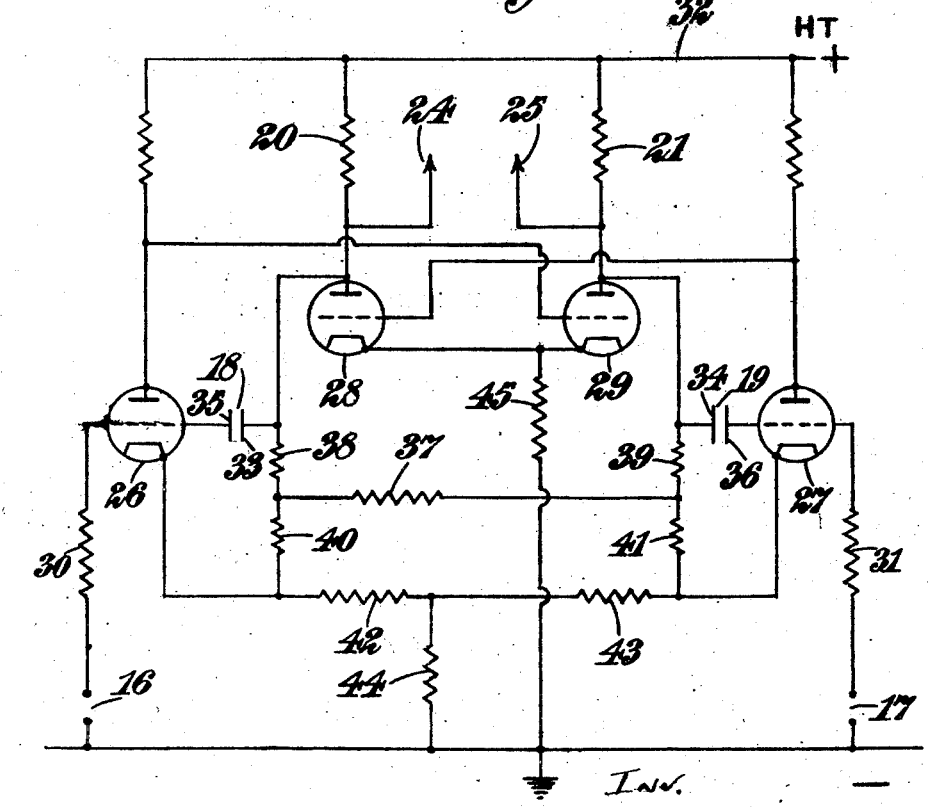
INV.
FREDERICK ROGER MILSOM Patented Jan. 29, 1952

2,583,587

UNITED STATES PATENT OFFICE 2,583,587

ELECTRIC INTEGRATING CIRCUIT

Frederick Roger Milsom, Boreham Wood, England

Application August 12, 1948, Serial No. 43,949
In Great Britain August 6, 1947

7 Claims. (Cl. 250—27)

This invention relates to circuits for integrating electric signals with respect to time. More particularly it is concerned with circuits for integrating with respect to time the difference between two varying electric signals.

According to the present invention, an integrating circuit for integrating with respect to time the difference of two varying electric signals comprises a pair of similar grid controlled valves, means for respectively feeding each signal to the control grid of one of said pair of valves and two integrating condensers each respectively having one plate connected to the control grid of one of the pair of valves and the other plate connected through a phase reverser to the anode of the other valve, whereby the difference in the voltage outputs from the said phase reversers is proportional to the integral of the change of the difference of the two input signals.

If the signals are voltage signals it is necessary to apply them through a resistance to the aforesaid grids, while if they are current signals the input terminals may be connected direct to the grids.

Each phase reverser is preferably a grid controlled amplifying valve, the anode thereof being connected directly to one side of an integrating condenser as well as to a supply of high positive voltage through a resistor and the control grid thereof being connected to the anode of the grid controlled valve whose grid is connected to the other integrating condenser.

Preferably also the two grid controlled valves are similar and have corresponding components in their circuits with equal values as have also the two phase reversers.

The nature of this invention and the manner in which it is to be performed will be more clearly understood from the following description of one specific form of the integrating circuit reference being made to the accompanying drawings in which:

Figure 1 is a circuit diagram indicating a circuit for approximately integrating with respect to time a variable electric voltage and Figure 2 is a circuit diagram indicating a circuit for accurately integrating with respect to time two differentially varying electric voltages.

Referring to Figure 1, 12 is a resistance and 13 a condenser. As is well known, if a voltage is applied to the terminals 14, 15 the current through resistance 12 charging condenser 13 is approximately proportional to that voltage, and hence the voltage appearing across condenser 13 is approximately proportional to the integral with respect to time of the applied voltage, provided the output voltage is small compared with the applied voltage. If the output voltage exceeds a small fraction of the input voltage, the integration is not accurate since the voltage across resistance 12 is the difference between the charging voltage and the output voltage and hence the charging current is not proportional to the charging voltage.

Turning now to Figure 2 two varying voltages are applied between the terminal points 16, 17 and earth. The voltages are integrated by the integrating condensers 18 and 19 and a voltage proportional to the integral with respect to time of the difference of the input voltages appears between terminals 24 and 25.

The junction of resistance 30 and condenser 18 is connected to the grid of triode 26, the anode of which is connected through a resistance to a source of high positive potential 32. Similarly the junction of resistance 31 and condenser 19 is connected to the grid of triode 27.

The anodes of valves 26, 27 are connected to the grids of triodes 29, 28 respectively and the anodes of valves 28, 29 are respectively connected to the plates of condensers 18, 19 not connected to valves 26, 27. The anodes of valves 28, 29 are also connected to the high positive potential source 32 through resistances 20 and 21.

The capacities of condensers 18, 19 and the values of resistances 30, 31 are equal.

Grid bias for the valves 26, 27, 28 and 29 is provided by the resistance network comprising resistances 37 to 45.

The operation of the circuit is as follows:

Any change in the potential of the grid of valve 26 will result in an amplified change in the opposite sense in the potential of the grid of valve 29 and hence in an amplified change in the same sense of the potential of plate 34 of condenser 19. Similarly, any change in the potential of the grid of valve 27 will result in an amplified change in the same sense of the potential of plate 33 of condenser 18.

For the purpose of explaining the operation of the circuit, it will be supposed that the voltages applied to the points 16, 17 vary differentially from some datum value (K) so that the potential of point 16 rises to $K+x$ while that of 17 drops to $K-x$. Let the gains of valves 26, 27 be $m_1$ and the gains of valves 28, 29 be $m_2$ and suppose that, as a consequence of the changes of potential points 16 and 17, the anode voltage of valve 29 changes by $y$ (and that of valve 28 therefore by $-y$).

Then $y = m_1 m_2 z$ where $z$ is the change in potential at the grid of valve 26. Thus if $y$ is finite and the product of the gains of valves 26 and 29 is very large, the net input at the grid of valve 26, $z$, will be very small, as is usually the case with circuits having a large amount of negative feed-back. Thus the potential at the grid of valve 26 remains substantially fixed, as does also that at the grid of valve 27.

As a result of this, the currents flowing in resistances 30, 31 are strictly proportional to the variations of the potentials of terminals 16, 17 respectively. These currents charge the condensers 18, 19, and, as the charging currents are strictly proportional to the applied voltages, as distinct from the circuit of Figure 1, in which this is not the case, the voltages across condensers 18, 19 will be strictly proportional to the integrals with respect to time of the variations in the potentials at the terminals 16, 17 respectively, from the datum value K. In particular, since the grid potentials of valves 26, 27 are substantially fixed, the potentials of plates 33, 34 will be respectively proportional to these integrals and thus the variations in the difference between the voltages at the anodes of valves 28, 29 must be proportional to the integrals with respect to time of the difference between the voltages at terminals 16, 17.

If the potential of the grid of valve 26 rises the potential of plate 34 will rise by a larger proportionate amount, and the tendency of the potential of plate 36 to fall (by reason of the decrease of potential applied between terminal 17 and earth) will be opposed. By an effect similar, therefore, to known negative feed-back circuits the potential at the grid of valve 27 will remain substantially fixed if the product of the grids of valves 26 and 28 is large and the current flowing in resistance 31 will be proportional to the variation of the potential at terminal 17. To accommodate this current the voltage across condenser 19 must change and, as the potential of plate 36 is substantially fixed, the potential of plate 34, i. e. the variation in potential at the anode of valve 29, must be proportional to the integral with respect to time of the variation of the voltage at terminal 17 from the datum. Similarly the variation in the potential voltage at the anode of valve 28 must be proportional to the integral with respect to time of the variation of the voltage at terminal 16. The difference between voltages at the anodes of valves 28, 29 will therefore also be proportional to the variation in the input voltages from the datum. Now it will be obvious that any variation in the datum voltage K, supposing the circuit to be symmetrical, will leave the differences between both the voltages at terminals 16 and 17 and at the anodes of valves 28 and 29 unaltered, i. e. the circuit will always integrate with respect to time the difference between the input voltages at terminals 16, 17.

As is known from the general theory of negative feed-back circuits the larger the total gain the less the net input voltage variation to the circuit, and hence the larger the gain of each of the valves 26, 27, 28, 29, the smaller will be the variation in voltage at the grids of valves 26 and 27 and the more accurate will be the integration.

If the input signals are applied from "constant current" sources the resistors 30, 31 can be omitted, and the output voltage between terminals 24, 25 will, then be proportional to the integral with respect to time of the difference between the input currents.

Any tendency of the circuit towards push-push self-oscillation is counteracted by the push-push feed-back through resistances 44 and 45 which leaves the push-pull or differential action of the circuit unaffected.

I claim:

1. An integrating circuit for integrating the difference between two electric signals comprising a pair of similar grid-controlled anode-loaded tubes, means for respectively feeding each signal to the control grid of one of said pair of tubes, a pair of similar phase-reversing amplifiers, and two similar integrating condensers, the anode of the first grid controlled tube being connected to the input of the first phase-reverser and the output of the first phase-reverser being connected to one side of the first integrating condenser, the other side of the first integrating condenser being connected to the grid of the second grid controlled tube, the anode of the second grid-controlled tube being connected to the input of the second phase reverser, the output of the second phase-reverser being connected to one side of the second integrating condenser, and the other side of the second integrating condenser being connected to the grid of the first grid controlled tube, whereby the difference between the voltage outputs of the said phase-reverses is substantially proportional to the integral of the difference between the input signals.

2. An integrating circuit as claimed in claim 1 for integrating the difference between two electric voltage signals comprising also means for applying the signals respectively through equal resistors to the grids of said grid controlled tubes.

3. An integrating circuit as claimed in claim 1 comprising also a push-push negative feed-back circuit between the output and the input of said grid-controlled amplifying tubes.

4. An integrating circuit as claimed in claim 1 comprising also a push-push negative feed-back circuit between the output and the input of said phase-reversers.

5. An integrating circuit as claimed in claim 1 comprising also a push-push negative feed-back circuit between the output and the input of said phase-reversers and said grid controlled amplifying tubes.

6. An integrating circuit for integrating the difference between two electric voltage signals comprising a first pair of similar grid-controlled anode-loaded amplifying tubes, a second pair of similar grid controlled anode-loaded amplifying tubes, two similar integrating condensers, the anode of the first of the first pair of tubes being connected to the grid of the first of the second pair and the anode of the second of the first pair and being connected to the grid of the second of the second pair, the first integrating condenser connected between the anode of the first tube of the first pair and the grid of the second tube of the second pair, the second integrating condenser connected between the anode of the second tube of the first pair and the grid of the first tube of the second pair respectively, two pairs of input terminals, one terminal of each pair being connected together, two similar resistors connected respectively between the grids of the first pair of tubes and the remaining two input terminals and first and second unbypassed resistor providing common return between the cathodes of the first and second pairs of tubes and the joined input terminals respectively to oppose any tendency of the circuit to push-push oscillation.

7. An integrating circuit for the algebraic integration of two electric signals comprising two similar grid-controlled anode-loaded amplifying tubes, two similar phase reversing amplifiers, a first condenser means connecting the control grid of one of said tubes and the plate of one of said amplifiers, a second similar condenser means connecting the control grid of another of said tubes and another of said amplifiers, the control grid of said other of said amplifier being connected to the plate of said first tube, the control grid of said first named amplifier connected to the plate of said other tube, and two similar signal supply circuit portions respectively connected to supply signals to each of two said tubes whereby said signals may be integrated and a desired value relation thereof is determined.

FREDERICK ROGER MILSOM.

REFERENCES CITED

The following references are of record in the file of this patent:

UNITED STATES PATENTS

| Number | Name | Date |
| --- | --- | --- |
| 2,251,973 | Beale | Aug. 12, 1941 |
| 2,338,395 | Bartelink | Jan. 4, 1944 |
| 2,412,485 | Whiteley | Dec. 10, 1946 |